March 3, 1942. A. TOWART, JR Re. 22,045

HIGH PRESSURE FLUID MEDIUM CONTAINER AND CONTROL VALVE THEREFOR

Original Filed March 3, 1938

INVENTOR.
ARCHIE TOWART, JR.

BY

J. William Carson
ATTORNEY.

Reissued Mar. 3, 1942

Re. 22,045

UNITED STATES PATENT OFFICE 22,045

HIGH PRESSURE FLUID MEDIUM CONTAINER AND CONTROL VALVE THEREFOR

Archie Towart, Jr., West Caldwell, N. J., assignor to Specialties Development Corporation, Bloomfield, N. J., a corporation of New Jersey Original No. 2,258,869, dated October 14, 1941, Serial No. 193,713, March 3, 1938. Application for reissue December 13, 1941, Serial No. 422,888

8 Claims. (Cl. 221—73.5)

The present invention relates to high pressure fluid medium containers and control valves therefor equipped with an easily manipulated finger-operated control and adapted for use with fire extinguishers and other high pressure fluid medium applications.

The invention relates more particularly to applications that call for a given amount of liquefied carbon dioxide gas stored under high pressure in a small, portable container which is to be conveniently and easily released and applied to any desired spot, at the same time providing facilities against accidental or undesired release of the fluid medium, as well as including the provision of a safety release for unsafe pressures. A device of this type usually consists of a metallic container, and mounted on the container a valve or release head to confine the carbonic acid in the container during storage and to permit the medium to escape from the container when it is desired to employ it. Attached to the valve is either a flexible hose or short rigid pipe element to conduct the medium to an outlet nozzle usually provided with a shield, from which the medium escapes to the point of desired application. The usual practice has been to employ a hand-turnable screw valve, and more rarely some sort of spring controlled self-closing valve for lower pressures, while various types of handles, either on the body of the container or secured to the release head have been the rule.

There are a number of objections to valves of that nature as combined with handles and containers of the type under consideration, such as the very great force required to turn open such a valve, requiring the use of two hands for operating the devices of known construction, especially when intermittent shutting off is called for, while spring controlled self-closing and other conventional valve types under conditions of high pressures as in this case have not been found feasible due to structural, leakage and cost considerations. Another objection to spring controlled self-seating valves is the fact that they will close even when the container is empty, which is not desirable, as it may convey the impression that the container is fully charged and ready for use, while in reality only a very small part of the original charge may have been retained or none at all. Since applications of such a device frequently involve a question of safety, such as in fire extinguishing, it therefore becomes important that the valve is closed only when the requisite amount of compressed gaseous fluid medium is in the container.

It is accordingly an object of this invention to provide a container for a releasably stored high pressure fluid medium which lends itself to convenient one-hand, one-finger operation, requiring only a relatively small operating force to release the fluid medium.

It is another object of the invention to provide a container of the type referred to, the discharge of which may be regulated as to volume and period, very finely and very quickly, by one-finger manipulation.

Another object of this invention is to provide a container of the above character which has means to guard against undesired operation or release of the fluid medium stored therein due to undesired manipulation, and means to prevent an unsafe increase in pressure of the confined fluid medium due to an increase in the surrounding temperature.

It is a further object of this invention to provide a container of the above character which is so designed as to confine its contents by means of its own pressure, and which will remain open unless a specified minimum pressure exists within the container.

It is a still further object of this invention to provide a container of the character referred to which is simple and inexpensive in construction and which is mechanically trouble-free.

Further objects, not specifically enumerated above, will be apparent as the invention is described in greater detail in connection with the accompanying drawing.

The above objects are accomplished by an embodiment of the invention which provides for a portable container, the fluid pressure medium in which may be released by a one-hand, one-finger operated trigger-operated valve operable from a grip handle, comprising a valve stem and a freely or readily movable valve head held in position by the pressure of the medium it confines, which enables the operator to hold the container, and regulate the discharge thereof as desired with one hand.

Referring now to the drawing.

Figure 1:
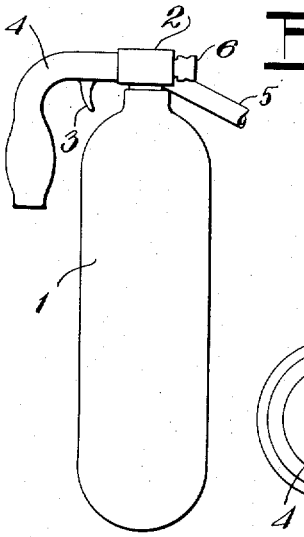
Figure 1 is a side elevational view of a container equipped in accordance with the present invention.

Referring to Figure 1, the device consists of a container 1, to which is attached a valve 2, which will be described in detail hereinafter. The valve 2 is operated by means of a trigger 3 mounted in the grip handle 4 attached to the body of the valve. The fluid medium finally escapes through the hose or piping 5 secured to an outlet on the back side of valve 2 as viewed in Figure 1. Valve 2 carries a safety release plug 6, which permits of an escape of the fluid when the pressure in the container reaches a predetermined safety limit.

Figure 2:
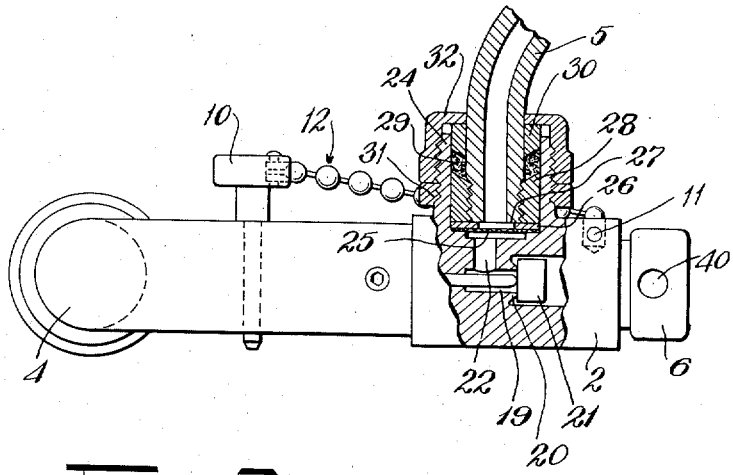
Figure 2 is a top plan view of Figure 3 in partial section.
Figure 3:
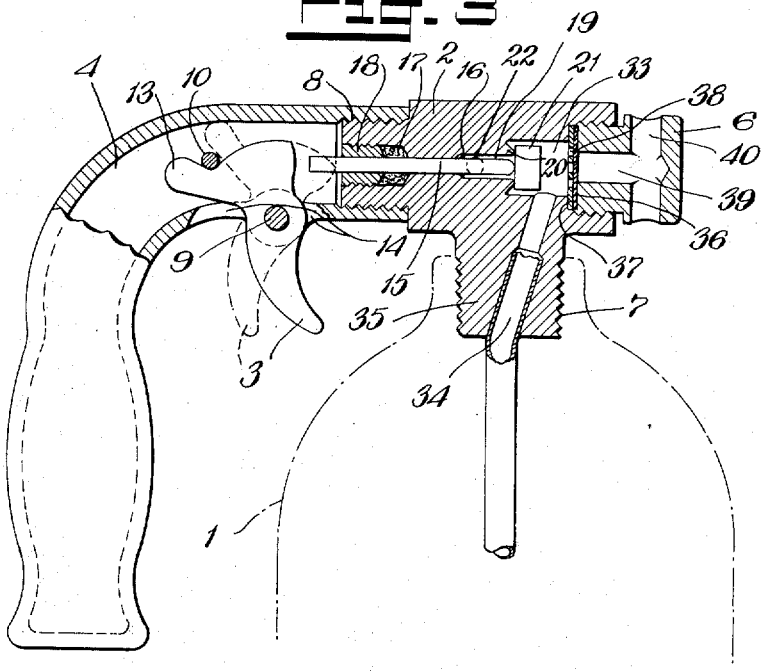
Figure 3 is a sectional detailed view of the upper part of container of Figure 1, showing the fluid medium releasing arrangement.

The valve as above referred to will now be described with reference to Figures 2 and 3. Here the valve body 2 is shown threadedly secured at 7 in a neck opening of container 1. To the valve body 2, at 8, is attached also by means of threads the hollow curved grip handle 4. Centrally placed within the handle 4, with its lower portion protruding outside of the body of the handle and pivoted on the trigger pin 9, is the trigger 3. The movement of the trigger 3 is restricted by means of locking pin 10, which is loosely attached to the valve body 2 at 11 by means of the locking pin chain 12. The stem of the locking pin 10 extends through the body of grip handle 4 in such a manner as to engage the projection 13 of the trigger 3 and act as an effective stop to any movement of the trigger toward the valve. When operation of the trigger is desired, the locking pin 10 is pulled out of the handle, allowing free movement of the trigger within the longitudinally formed slot 14 in the handle 4. The trigger 3 when actuated acts upon a pin-stem 15 slidably disposed within a central longitudinal bore 16 of the valve body 2. Packing 17, held in place by screw plug 18 in said bore, which is enlarged accordingly, prevents any leakage of the fluid medium toward the handle along the pin-stem 15. The bore 16, at its end away from the handle, is enlarged to form an escape chamber 19 and a valve seat 20, against which is seated a compressible rubber valve check 21, held in place by the pressure of the fluid medium in the container, which check valve is not in any way connected to the pin-stem 15 and is otherwise freely or readily movable. A discharge passage 22 leads from escape chamber 19 to the outlet conduit 5 attached to tubular extension 24 of the valve body 2. The outlet connection is of the swivel type and comprises a fine mesh screen 25 placed at the bottom of tubular extension 24, which serves the purpose of stopping any dirt or foreign matter from passing into the conduit 5 and thence to any small passage or nozzle to which the conduit may lead. A friction washer 26 is located between mesh screen 25 and the bearing end 27 of conduit 5. A bearing assembly on the bearing end of conduit 5, adapted to swivel in the tubular extension 24, is made up of a threaded ring nut 28, a ring packing 29 and a ring bearing 30 fastened securely to conduit 5, as by soldering. An adjustable ring nut retainer assembly threaded onto the outside of extension 24, comprises ring nuts 31 and 32, the latter flanged and serving to confine the bearing formation described above in the tubular extension 24. The entire combination forms a leakage-tight swivel joint of outlet conduit 5 with valve body 2. The valve check 21, being wholly unattached, is freely or readily movable in valve chamber 33, which constitutes a further enlargement of central bore 16 and which is in communication with the inside of container 1 by means of syphon tube 34 secured into extension 35 of valve body 2. Valve chamber 33 is closed by a frangible safety disc 36 which will break and permit the fluid medium to escape to the atmosphere upon the medium in the container attaining a predetermined pressure considered the safety limit of the container. The safety disc 36 is held in the recessed and threaded end of the valve body 2 adjacent to valve chamber 33 between a perforated gasket-washer 37 and safety relief plug 6 threaded into said recessed and threaded end of valve body 2. The safety disc is exposed to the pressure fluid medium in valve chamber 33 through perforation 38 in the gasket-washer rather than through a large central opening, so as to avoid the possibility of having the rubber valve check 21 wedge in such an opening when the container is being charged through the discharge passage 22 and the full pressure of the fluid medium is applied against the check from the outside. The safety relief plug 6 has a central longitudinal passage 39 terminating in radial passages 40, which serve to eliminate any recoil action of the escaping fluid medium under high pressure by dividing the issuing medium into two equal and opposing jets.

From this description, it will be readily apparent that when it is desired to release the fluid medium, the locking pin 10 is withdrawn from the handle 4, and by finger action, trigger 3 is made to bear against pin-stem 15, which in turn acts against valve check 21. A slight force only will be required to unseat the check, as upon an initial "easing away" of the check from any portion of its seat under the influence of the pin-stem, the fluid medium present under pressure in the valve chamber 33 will escape past the seat 20 into escape chamber 19 and thus help the pin-stem to unseat the check, the valve of the present invention being accordingly in contrast to other types of valves requiring great force to open, as e. g. threaded valves which have to be closed very tightly in order to be leakage proof. It has also been found that valves with a bonding connection between the stem and check are not proof against leakage. However, in the present instance, the pressure of the medium presses the compressible check onto its seat in such a manner as to make leakage impossible, at the same time enabling an easy opening, the compressibility of the check being quite instrumental in accomplishing this result. It has also been found that a cup in the center of the check for reception of the pin-stem is more detrimental than helpful, as during recharging, the stem and check will be separated and a proper reunion would be difficult to obtain. Furthermore, due to the pressure under which the medium is stored, it is not necessary and not practical to entirely unseat the check. In fact, under ordinary circumstances, the pressure does not permit of total unseating of the check, so that as soon as the trigger is released, the pressure acting in the back of the check causes it to seat again, pushing the pin-stem back toward the trigger. The relative proportions of seat 20, check 21 and valve chamber 33 are such as to insure a proper reseating of the check. It will be seen, therefore, that with a minimum of effort a very fine regulation as to period and volume may be had with this type of release. The fluid medium, upon opening of the check 21, escapes via passage 22 into conduit 5 and may be directed to any desired spot in a given direction by manipulation of the swivel joint between valve body 2 and conduit 23. When the container has been emptied entirely or to a predetermined low degree, the pressure in the container will not be sufficient to seat the check again, and the outlet remains open permanently, the looseness of the trigger and pin-stem indicating the condition of the container. The container may be recharged in this condition by simply connecting discharge passage 22, via the conduit or after its removal, to a source of high pressure fluid medium until a desired quantity of such medium is introduced into the container. Under recharging conditions, the check will be thrown against the perforated washer-gasket 37, permitting the fluid medium to enter the container through the syphon 34. As soon as the recharging pressure is lifted from escape passage 22, the pressure in the container will force the check back onto the seat, effecting a permanent and gas tight seal. It will be seen, therefore, that the present design possesses numerous advantages over prior devices under the operating conditions as outlined above.

I am, of course, aware that many changes in the details of construction and relative arrangement of parts will readily occur to those skilled in this art and I do not, therefore, desire to be strictly limited to the illustration in the drawing, which has been given to set forth the principles of this invention, but rather to the scope of this invention as it is defined in the appended claims.

I claim:

1. In combination, a container adapted to releasably store a fluid medium under pressure, a valve body secured to the container having an inlet passage, a valve chamber, and a discharge passage, safety release means closing said valve chamber and including a fluid medium passage, adapted to release the fluid medium upon its attaining a predetermined unsafe pressure, a seat formed between said discharge passage and valve chamber, a freely movable compressible valve disc in said valve chamber, normally not seated and adapted upon fluid medium being introduced under high pressure through the discharge passage for the purpose of recharging to be thrown against said safety release means, permitting free entry of the fluid medium into the container, and further adapted upon cessation of the recharging pressure through the discharge passage to be seated and retained upon said seat by means of the pressure of the fluid medium now within the container, means to prevent entry of the compressible valve disc into the fluid medium passage of the safety release means, and means to unseat said valve disc normally out of contact therewith.

2. In combination, a container adapted to releasably store a fluid medium under pressure, a valve body secured to the container having an inlet passage, a valve chamber, and a discharge passage, a seat integral with said valve body formed between said discharge passage and valve chamber, a freely movable compressible valve disc in said valve chamber, normally not seated and adapted upon fluid medium being introduced under high pressure through the discharge passage for the purpose of recharging to be thrown against a wall of the valve chamber, permitting free entry of the fluid medium into the container, and further adapted upon cessation of the recharging pressure through the discharge passage to be seated and retained upon said seat by means of the pressure of the fluid medium now within the container, a handle secured to the valve body, a pin slidably disposed in the valve body adapted to act to unseat the valve disc to release the fluid medium but normally out of contact therewith, a trigger mounted on said handle, adapted by single finger manipulation to move said pin to cause it to unseat said valve disc but normally out of contact with the pin, and removable means disposed on the handle to normally prevent movement of the trigger toward the pin.

3. In a valve, a valve body having an inlet passage, a valve chamber, and a discharge passage, safety release means including a fluid medium passage forming a closure of the valve chamber and adapted to open to the atmosphere when pressure in the valve chamber reaches a predetermined unsafe value, a seat formed in said discharge passage, a wholly unattached compressible discharge passage closure disc in said valve chamber adapted to seat on said seat and to be retained thereon mainly by action of pressure in the valve chamber, means to prevent entry of the compressible closure disc into the fluid medium passage of the safety release means, a pin slidably disposed in said valve body, normally out of contact with the closure disc to unseat it, and trigger means normally out of contact with the pin to move said pin toward the closure disc.

4. In a valve, a valve body having an inlet passage, a valve chamber, and a discharge passage, a seat formed in said discharge passage integral with said valve body, a compressible discharge passage closure disc in said valve chamber adapted to seat on said seat and to be retained thereon by action of pressure in the valve chamber, a pin slidably disposed in said valve body, normally out of contact with the closure disc to unseat it, a handle secured to the valve body, a trigger on said handle adapted by single finger manipulation to move said pin toward the closure disc, and normally out of contact with the pin, and removable means on said handle to normally prevent manipulation of said trigger.

5. In a valve, a valve body having an inlet passage, a valve chamber, and a discharge passage, safety release means comprising a safety relief passage leading from the valve chamber to the atmosphere and a frangible closure member normally closing said last passage and adapted to rupture at a predetermined excessive pressure in the valve chamber, a seat formed in said discharge passage, a freely movable compressible valve disc in said valve adapted to seat on said seat and to be retained thereon by action of pressure in the valve chamber, an apertured element between the valve chamber and the frangible closure member having apertures to permit the escape of pressure through the safety relief passage upon rupture of the frangible closure member but of a size to prevent entry of the compressible valve disc into the safety relief passage, and means to unseat said valve disc normally out of contact therewith.

6. In combination, a container adapted to releasably store a fluid medium under pressure, a valve body secured to the container having a discharge passage, a valve chamber having a wall at right angles to the line of flow through the chamber of any fluid stream from the discharge passage toward the container, and an inlet passage leading into said chamber at substantially right angles to said line of flow, a seat formed between said discharge passage and valve chamber, a wholly unattached and freely movable compressible disc in said valve chamber adapted to prevent any flow of fluid medium from the container toward the discharge passage when seated on said seat and adapted to be thrown against said wall to permit the flow of charging medium from the discharge passage toward the container, and means to actuate said valve disc normally out of contact therewith.

7. A liquid carbon dioxide fire extinguisher comprising in combination a container for liquid carbon dioxide having an opening, a valve body secured into said opening having a valve chamber, an outlet passage and an inlet passage in communication with said container, safety discharge means forming a part of said valve body in operative communication with the container and with the atmosphere adapted to provide a discharge passage for the fluid medium in the container beyond a given pressure therein, a seat formed in said outlet passage, a valve disc in said valve chamber unattached and freely movable substantially through the entire extent of the chamber and of a size so as to be confined in the chamber adapted to be seated on said seat by action of fluid pressure through said inlet passage, means unattached to said valve disc and normally out of contact therewith slidably disposed in said valve body adapted to unseat said disc, a grip handle secured to said valve body, trigger means pivotally disposed in said handle adapted to actuate said valve disc unseating means, and fluid medium discharge directing means secured into said valve outlet passage.

8. The combination in a portable liquid carbon dioxide fire extinguisher comprising a container for liquid carbonic acid, of a valve body for attachment to the container having a valve chamber, an inlet passage leading into said chamber and an outlet passage leading from said chamber, safety discharge means forming a wall of said chamber adapted to provide a discharge passage for a fluid pressure medium in the container beyond a given pressure therein, a seat formed in said outlet passage, and a readily movable valve disc entrapped in said chamber adapted to be seated on said seat and to be retained thereon mainly due to action of fluid pressure through the inlet passage.

ARCHIE TOWART, JR.